INVENTORS:
MARCEL SAVIGNAT
LOUIS BENJAMIN LE GOUPIL
By Amster & Rothstein
ATTORNEYS INVENTORS:
MARCEL SAVIGNAT
LOUIS BENJAMIN LE GOUPIL
By Amster & Rothstein
ATTORNEYS INVENTORS:
MARCEL SAVIGNAT
LOUIS BENJAMIN LE GOUPIL
By Amster & Rothstein
ATTORNEYS United States Patent Office 3,451,390
Patented June 24, 1969

1

3,451,390
OSCILLOMETER-TENSIOMETER
Marcel Savignat, Paris, France, and Louis Benjamin Le Goupil, 30 bis Rue Rottembourg, Paris, France; said Savignat assignor to said Le Goupil
Continuation of application Ser. No. 410,114, Nov. 10, 1964. This application June 28, 1967, Ser. No. 649,708
Claims priority, application France, Nov. 13, 1963, 953,544
Int. Cl. A61b 5/02
U.S. Cl. 128—2.05 8 Claims

ABSTRACT OF THE DISCLOSURE

An oscillometer-tensiometer for measuring the amplitude and frequency of gaseous or hydraulic pulses which occur in a circuit. The instrument includes series-connected transparent tubes with pistons slidably mounted therein, in a fluid circuit. The pulses via pulse pickup means cause fluid flow to move the pistons, thereby giving a visual indication of the pulses.

This is a continuation of pending application Ser. No. 410,114, filed Nov. 10, 1964, and now abandoned, entitled "Oscillometer-Tensiometer."

The present invention relates to an oscillometer-tensiometer which is adapted to make gaseous or hydraulic pulses occurring in a circuit visible to a user of the instrument.

It is the primary object of the present invention to provide an oscillometer-tensiometer which visibly demonstrates both the amplitude and frequency of gaseous or hydraulic pulses which occur in a circuit. The invention is desirably embodied in an instrument having a housing holding one or more in-series transparent tubes, each tube having a scale associated with it. Each such tube has a relatively light piston slidably captured in its interior for movement along the axis of the tube. The strokes of these pistons are limited at the ends of the tubes by stops. These tubes of the instrument are in the fluid circuit of the instrument, and the aforesaid stops have apertures therein to permit said fluid to freely flow by these stops. The pistons constitute indexes which are reciprocated within their respective tubes by the flow of the fluid and whose positions can be read from the scales associated with the tubes. The fluid circuit of the instrument is connected at one end of the source of the pulses and at the other end to an elastic expansion chamber which is of variable volumetric capacity. The expansion chamber may be, for example, a metal bellows, a rubber diaphragm, a flexible elastic hose or the like.

The pulses at the source act upon the fluid circuit of the instrument to produce fluid displacement as a function of the amplitude of the pulses and also as a function of the pressure in the fluid circuit. The aforesaid pulses cause fluid flow from the end of the circuit adjacent the pulse source along the circuit and toward the expansion chamber and in so doing cause the indexing pistons to travel in their respective tubes. Diminution of the pulses causes fluid flow in the opposite direction. The extent of movement of the aforesaid pistons can be read on the scales associated with the tubes so that the amplitude of the pulses can be determined.

In a desirable form of the present invention, the inner diameters of the tubes differ and the diameters of the pistons of the respective tubes make a slidable fit with these various diameters so that as fluid flow takes place, the pistons move to a different extent and thereby are of different sensitivities. This is especially valuable at very low pulse amplitudes to that at least the movement of the

2 most sensitive piston is always observable to the user of the instrument. The most sensitive piston is, of course, the one which slides in the tube having the smallest diameter.

It is a further object of the present invention to provide an oscillometer-tensiometer of the character described wherein the indexing pistons in addition to enabling a user of the instrument to observe the amplitude of the pulses, enable such a user to observe the frequency of the pulses by observing the frequency of the pistons as they reciprocate through their respective strokes.

It is a further of the present invention to provide an oscillometer-tensiometer of the character described wherein a manometer and a pressure-controlling device are integrated into the fluid circuit of the instrument so that both the ampitude and the frequency of the pulses may be determined as a function of the pressure within the fluid circuit.

It is a further object of the present invention to provide an oscillometer-tensionmeter of the character described which is adapted to be utilized as a sphygmomanometer for measuring the frequency and amplitude of the pulses in the arteries of humans, even when such amplitude and frequency are quite low, for reading the arterial blood pressure and for controlling the regularity of the cardiac rhythm. In this embodiment, the pulses at the source are detected by a conventional arm band connected, as is known, to a hand-operable air pump, i.e., a rubber bulb which introduces air pressure into the arm band and which further includes a hand-operable valve for permitting gradual release of such pressure.

The above brief description, as well as further objects, features, and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
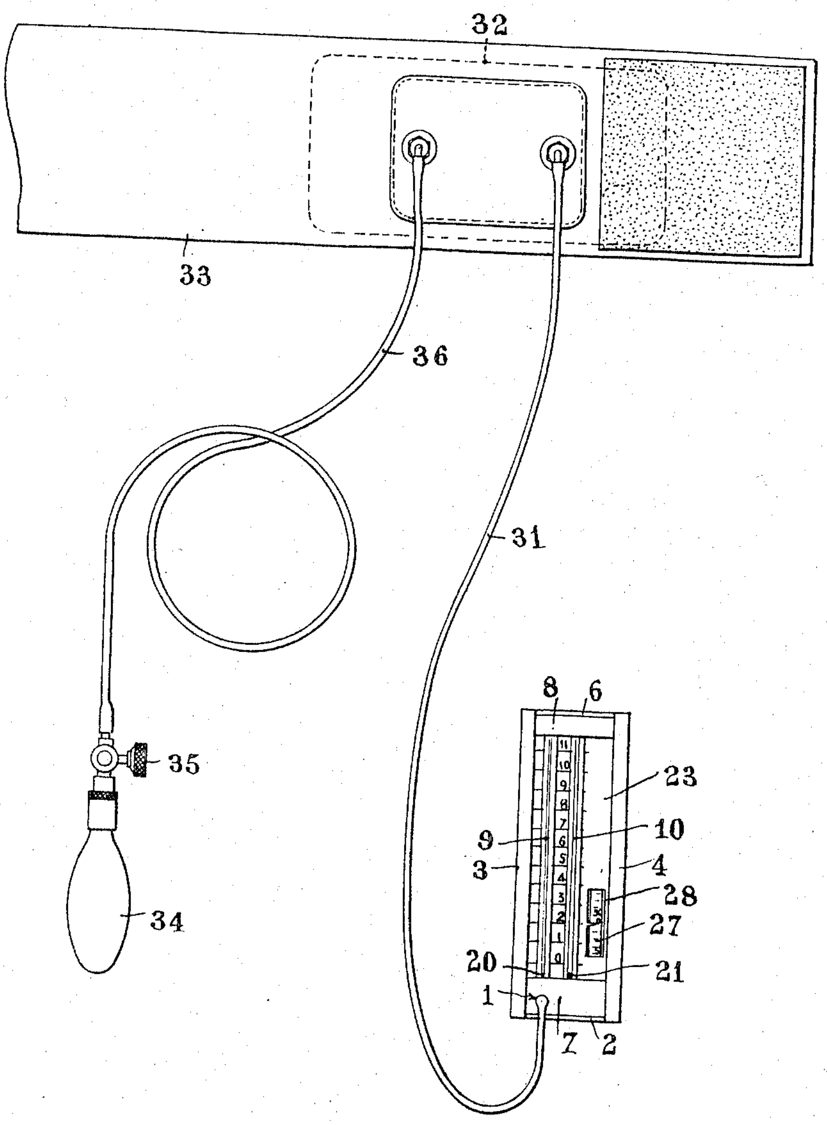
FIG. 1 is an elevational view of the oscillometer-tensiometer of the present invention, illustrating the same connected to an arm band in which pressure is built up by a hand-operated air bulb.

Referring now in detail to the drawing, the oscillometer-tensionmeter comprises an instrument of the sphygmomanometer type. The instrument has a housing which mounts a hollow connector 1 which is adapted to be connected to a flexible hose 31. The hose communicates with an elastic inflatable bag 32 of a cuff or arm band 33. The bag 32 is connected by a flexible hose 36 to a hand-operable rubber inflating bulb 34 which has a hand-operable pressure-release valve 35 for gradual controlled release of air from the bag 32. It will be appreciated that the arm band 33 including the bag 32, the bulb 34 and the valve 35 are entirely conventional and known for medical purposes.

The instrument housing has a base plate 2, a pair of spaced rearwardly inclined uprights 3, 4 at its front, a vertical upright 5 at its rear and a cover 6 interconnecting the ends of said uprights 3, 4 and 5. An upper horizontal cross member 8 and a lower horizontal cross member 7 run between the inclined front uprights 3, 4.

The instrument further includes a pair of upright transparent glass tubes 9, 10. The ends of the glass tubes are held by the cross members 7, 8. For this purpose, the cross members have bores of a diameter slightly larger than the outside diameters of the glass tubes to receive the ends of the tubes. Desirably, the ends of said tubes are cushioned by washers 37 (see FIG. 3).

Figure 2:
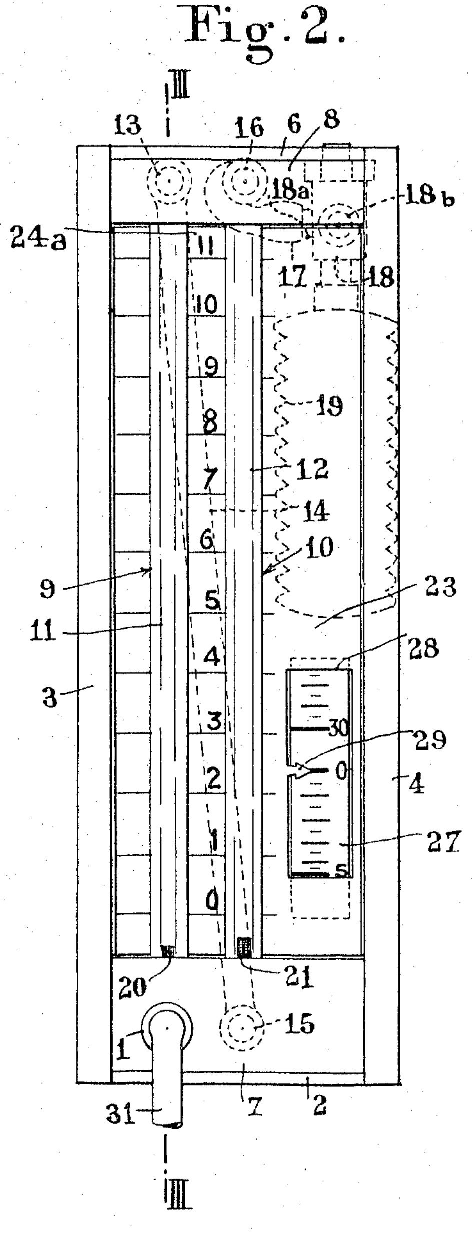
FIG. 2 is an enlarged front elevational view of the oscilliometer-tensiometer.
Figure 3:
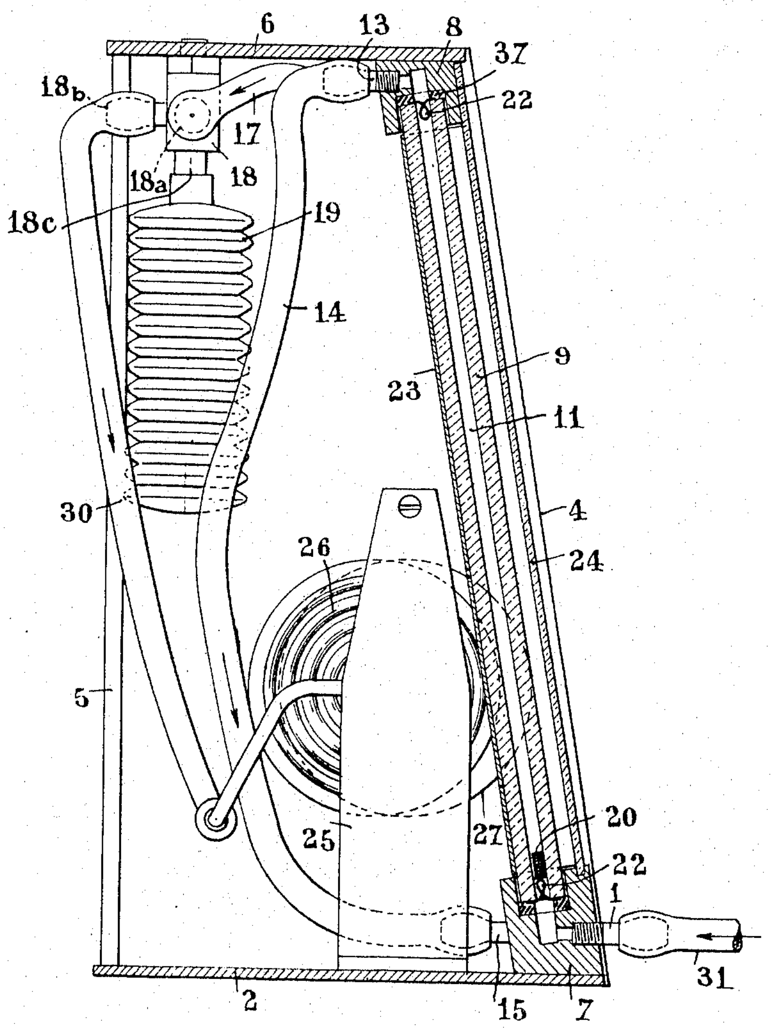
FIG. 3 is a cross-sectional view of the oscillometer-tensiometer taken substantially along the line III—III of FIG. 2.

The glass tubes 9, 10 are similar except that the inner diameter 12 of the glass tube 10 is twice the inner diameter 11 of the glass tube 9. The tubes are series-connected. As best shown in FIG. 3, the connector 1 communicates with the interior 11 of the glass tube 9 at the lower end of said glass tube. The upper end of the interior 11 of the glass tube 9 is connected by a hollow connector 13 through a rubber hose 14 to a hollow connector 15 which communicates with the lower end of the interior 12 of the second glass tube 10. The upper end of the interior 12 of the glass tube 10 is connected by another hollow connector 16 (see FIG. 2) through a rubber hose 17 to a duct **18*a* of a manifold 18. The manifold is secured to the cover 6. Another duct 18*c* leads from the manifold 18 to an elastic expansion chamber 19. The chamber 19 is of the expandible bellows type, and may be a metal bellows, a rubber diaphragm, a flexible elastic hose or any other suitable device of this general type. The capability of the chamber 19 to expand enables the fluid circuit to absorb the various pressures delivered to it from the hose 31**.

Each of the tubes 9, 10 has a small, very light piston slidably captured in its interior for movement along its longitudinal axis. The piston 20 slides in the tube 9 (see FIG. 3) and the piston 21 slides in the tube 10 (see FIGS. 1 and 2). It is evident that the outside diameters of the pistons closely match the inside diameter of their respective tubes so that the pistons can slide within their tubes, yet no fluid can leak past the pistons.

Each tube has a stop 22 at each of its ends. Said stops may simply be a twist of wire which serves to limit the stroke of each piston within its tube yet permit unhampered flow of fluid past the stop. A transverse plate 23 is located towards the front of the housing, but in back of the tubes 9, 10. The plate serves to conceal the interior of the instrument and the tubes stand out in sharp contrast against it. The plate 23 carries a scale as at **24*a*, disposed between the tubes 9, 10** (see FIG. 2) and the scale is graduated at equidistant points at values typically running from zero through eleven. The units of the scale primarily enable a user of the instrument to determine the relative extent of movement of the pistons, the units need not be of a known standard.

A panel 24 made of glass or of transparent plastic such as Plexiglas is fixed to the front face of the instrument to protect the glass tubes.

The instrument further includes a bracket 25 fixed to the base plate 2 which carries means indicating the pressure in the fluid circuit of the instrument. Said means may desirably comprise a manometric bellows 26. The bellows comprises a hollow drum 27 which is rotatably mounted on the bracket and which is off-set with respect to its axis. The bellows 26 is connected by a rubber hose 30 to another duct **18*b* of the manifold 18. Pressure differentials between the interior of the bellows (the pressure of the fluid circuit) and the exterior of the bellows (atmospheric pressure) cause rotation of the drum 27. The plate 23 has a window 28 (see FIG. 2) and the drum 27 has a graduated scale on its periphery which can be read from the front of the instrument through the window 28 in relation to a pointer 29 carried by the plate 23 and protruding into the window. It will be evident that since the bellows 26 is connected in series by the hose 30 to the fluid circuit, the pressure in the fluid circuit can be read by reading the scale on the drum 27. Such pressure in the fluid circuit can be brought to any desired level by manipulation of the bulb 34 and can be decreased to any desired level by operation of the valve 35**.

The operation of the instrument will now be reviewed briefly. The fluid circuit of the instrument may be traced initially from the bulb 34, through the valve 35 to the bag 32 carried by the arm band 33. The fluid in the bag 32 is placed closely against the human artery whereby the pulses are measured by the band being encircled about a limb, whereby the fluid in the bag initially is responsive to arterial pulsations. The fluid circuit continues from the bag 32 through the series-connected tubes 9, 10. The pistons 20, 21 are sufficiently light so that they transmit substantially all of the pressure applied on one of their sides to the other of their sides. Accordingly, it can be assumed that substantially the same pressure prevails throughout the fluid circuit. From the series-connected tubes, the fluid circuit continues to the expandible chamber 19, which expands to enable the circuit to absorb increased pressures transmitted from the initiating end of the circuit. The manometer 26 constitutes the end of the fluid circuit and enables a reading of the pressure of the circuit.

The fluid of the circuit commonly constitutes air, but other fluids may be employed.

In use, the arm band 33 is fitted to the limb enclosing the artery whose pressure is to be measured or whose pressure oscillations are to be observed through the use of the instrument. Air is supplied under pressure to the bag 32 by pumping by hand of the bulb 34. The bag 32 is a part of the same fluid circuit as is the manometer 26 and the expansible chamber 19.

As the pressure in the bag 32 is increased through pumping of the bulb 34, the pressure is transmitted through the fluid circuit to the chamber 19 which increases in volume in proportion to the pressure in the bag 32. Accordingly, with each variation in pressure in the bag 32, the chamber attempts to come to the same pressure and a balance is established. In this balancing, air flows from the bag 32 to the chamber 19, or from the chamber 19 to the bag 32. This air flow operates on and carries with it the pistons 20, 21 in the tubes 9, 10, which it will be recalled are in series between the bag 32 and the chamber 19. Since the pistons are very light and consequently of little inertia, the movements of the pistons give visible indication of the pressure variations applied to the bag 32.

As the diameters of the tubes are 2:1, the ratio of the areas of the faces of the pistons are 4:1. Accordingly, for a given fluid flow, the piston in the tube of smaller diameter will move four times the axial distance of movement of the other piston. The sensitivities of the pistons are thus 4:1, whereby a pressure variation of the most moderate degree will be visible by movement of the most sensitive piston. Simultaneously, the pressure of the bag 32 can be read in known units by observation of the manometer 26.

Thus, the instrument enables the ascertaining of arterial pulsations by observing the oscillations of pistons 20, 21, without having to measure the arterial pressure. With sufficient lengths for the hoses 31, 36, the pulse condition of patients from a distance can be known, as during comas, anaesthesia and glucemia; it may also be used, by displacing the arm band along an artery, to ascertain if this artery is operating satisfactorily throughout its length so as to determine the point from which it is no more operative.

This instrument may also be used in a more precise manner for measuring blood pressure or its modifications, by use of the scale **24*a* along which the piston 20 moves in the tube 9, and the piston 21 moves in the tube 10**.

As a typical example, an arterial pulsation may correspond to an amplitude of movement of an indexing piston which is 8 inches or 20 centimeters high. Under these conditions, the heart specialist can thus readily see any anomalies existing in the pulsation and interpret them by comparison with a normal pulsation.

To this end, the arm band is fitted around the limb containing the artery of which it is desired to measure the blood pressure. By operating the bulb 34, a pneumatic pressure is built up in the arm band which is greater than the maximum tension to be measured (systolic pressure). Under these conditions, the artery remains compressed and cannot exert any pulsing action on the arm band; therefore, no air can flow from the arm band to the expansible chamber 19 and thus the pistons 20 having risen to the top of their tubes at the beginning of the air compression in the expansible chamber move slowly downwards to the lower portion of their tubes, without any oscillation. Then, as in the conventional method, the valve 35 is cracked to gradually reduce the pressure within the arm band. When the blood begins to flow again (crest of systolic pressure), the pistons 20 for a very short period of time, begins to oscillate. As the blood circulates more and more freely as the pressure is continually reduced in the arm band, the piston 20 and the piston 21, for a longer time period, oscillate until an unrestrained pulsation is resumed, this being when the pressure in the arm band becomes equal to the minimum pressure (diastolic pressure). These minimum and maximum pressures can be read by use of the manometer and recorded. This method is considerably more accurate than possible with hitherto known instruments which do not permit clearly distinguishing the systolic pressure from the diastolic pressure.

A latitude of modification, change and substitution is intended in the foregoing disclosure and in some instances some features of the invention will be employed without a corresponding use of the other features. Accordingly, it is appropriate that the appended claims be construed broadly and in a manner consistent with the spirit and scope of the invention herein.

We claim:

1. An oscillometer-tensiometer for making pulses of a fluid visible to a user thereof, said oscillometer-tensiometer comprising a housing, at least two transparent tubes having different interior diameters mounted in the housing, conduits connecting the tubes in series, a light indexing piston slidably captured in each tube for movement along the axis of the tube, an apertured stop at each end of each tube for limiting the strokes of the pistons in the tubes yet enabling free fluid flow thereby, an elastic expansion chamber, a source of fluid pressure for sensing fluid pulses, and means connecting the source in series to the tubes in series to the chamber to form a fluid circuit, whereby pressure at the source is balanced by pressure in the chamber and pulses at the source cause fluid flow between the source and the chamber thereby to move the pistons and visibly indicate the amplitude and frequency of the pulses.

2. An oscillometer-tensiometer as set forth in claim 1 wherein the source is an arm band comprising an elastic inflatable bag, means for increasing the pressure in said bag and means for decreasing the pressure in said bag.

3. An oscillometer-tensiometer as set forth in claim 2 wherein the pressure-increasing means is a hand-operable air bulb and the pressure-decreasing means is a hand-operable pressure release valve.

4. An oscillometer-tensiometer as set forth in claim 1 wherein a scale is associated with the tubes to enable determination of the extent of the piston movement.

5. An oscillometer-tensiometer as set forth in claim 1 wherein a manometer is connected to the fluid circuit for enabling determination of the pressure of said circuit.

6. An oscillometer-tensiometer as set forth in claim 1 wherein there are two tubes and the ratio of the interior diameters of the tubes is 2:1.

7. An oscillometer-tensiometer as set forth in claim 6 wherein the tubes are held substantially vertically by the housing and the upper end of the tube closest to the source is connected by a conduit to the lower end of the other tube.

8. An oscillometer-tensiometer as set forth in claim 1 wherein the expansion chamber is a metal bellows.

References Cited

UNITED STATES PATENTS

| | | | |
|---|---|---|---|
| 1,245,559 | 11/1917 | Booth | 128—2.05 X |
| 1,640,920 | 8/1927 | Beachler | 128—2.05 |
| 3,056,299 | 10/1962 | Kormendy | 73—402 |

FOREIGN PATENTS

| | | |
|---|---|---|
| 784,697 | 5/1935 | France. |

WILLIAM E. KAMM, *Primary Examiner.*

U.S. Cl. X.R.

73—402